Sept. 4, 1956 R. B. MATTHEWS 2,762,000
ELECTROMAGNETIC CONTROL DEVICE
Filed Aug. 21, 1952 2 Sheets-Sheet 1

INVENTOR.
Russell B. Matthews
BY
Attys.

Sept. 4, 1956 R. B. MATTHEWS 2,762,000
ELECTROMAGNETIC CONTROL DEVICE
Filed Aug. 21, 1952 2 Sheets-Sheet 2
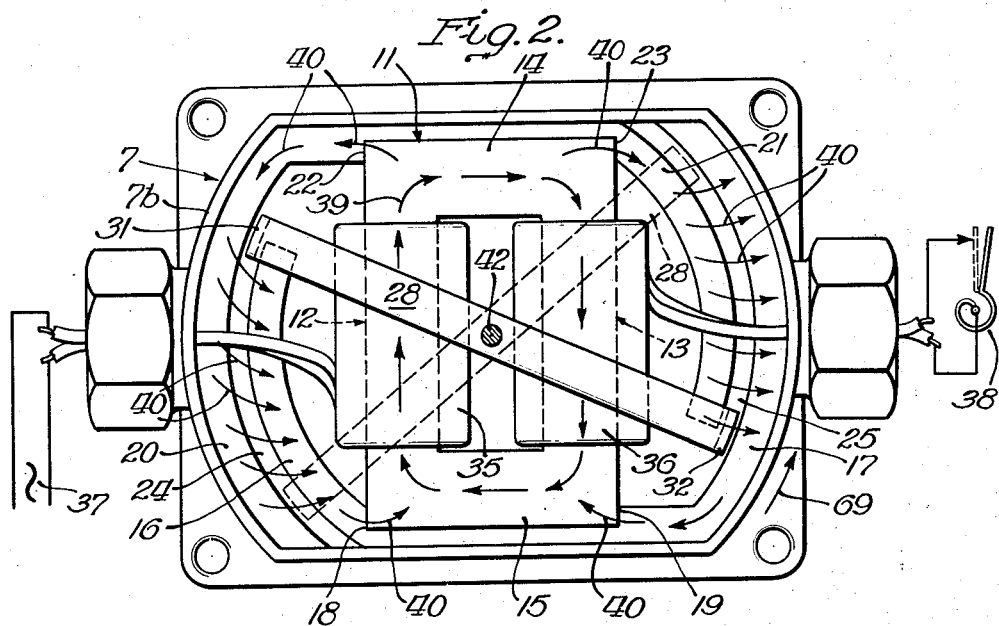
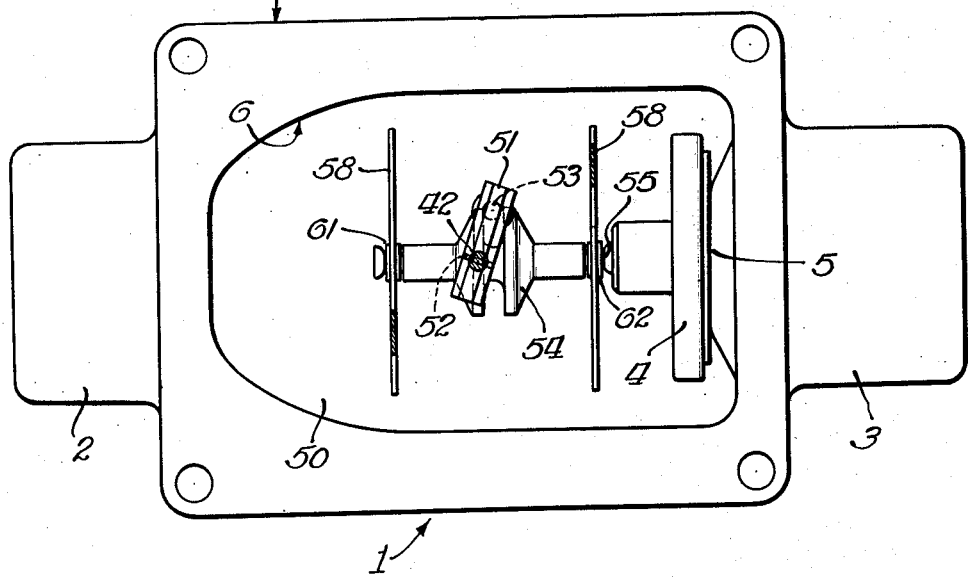
INVENTOR.
Russell B. Matthews
BY
Attys.

2,762,000
Patented Sept. 4, 1956

2,762,000

ELECTROMAGNETIC CONTROL DEVICE

Russell B. Matthews, Wauwatosa, Wis., assignor to Milwaukee Gas Specialty Company, Milwaukee, Wis., a corporation of Wisconsin Application August 21, 1952, Serial No. 305,585

11 Claims. (Cl. 317—168)

This invention relates, in general, to control devices, and more particularly, to electromagnetic operators having particular utility in the operation of valves or the like of novel construction and coaction for controlling the flow of fluids therethrough.

While I have shown and shall describe herein the electromagnetic operator of the present invention as applied for operating a valve, it is to be understood that it is not in its broader aspects limited to such use but may be employed for all similar purposes, for example, for operating a switch or the like or other desired device.

In the provision of apparatus of the character to which the present invention relates, certain basic considerations must be kept in mind. First, where, for example, the apparatus is for controlling the flow of fluid fuel to a main burner of fluid fuel burning apparatus, the valve must have sufficient capacity to be usable for this purpose. The capacity of a valve, it has been found, is for all practical purposes a function of the product of size or diameter of the valve and the distance which the valve member is removed from the valve seat when the valve is opened, such movement usually being against the sealing force of the valve member which, in turn, must be sufficient to prevent leakage of the valve when closed. It follows, therefore, that a given amount of work must be done to open a valve of given capacity and that the amount of force provided by the operator must be sufficient to do such work.

Accordingly, one of the main objects of the present invention is to provide an improved form of electromagnetic operator which will provide sufficient force for operating, for example, a valve for controlling the flow of fuel to a main burner even where the size or diameter of the valve is relatively large and the distance which the valve is removed from the valve seat when the valve is opened is relatively great. The operating force afforded by the electromagnetic operator of the present invention is also capable of moving such a valve against a sealing force sufficient to prevent leakage of the valve when closed.

Another object is to provide a compact and highly efficient operator which may be of smaller size to do a given amount of work and lends itself to economical fabrication, is silent in operation, and affords maximum operating force or torque at the start of the operator movement as distinguished from devices in which the force exerted initially is a minimum. This is advantageous in that it provides a large initial or starting force for overcoming the inertia and friction of the moving parts and a strong initial force which, for example, will overcome fluid pressures in "cracking" or opening a valve wherein the controlling fluid, such as gas for a gas heater, usually tends to hold the valve closed.

Another object is to provide an improved form of electromagnetic operator wherein there are one or more magnetic air gaps which are never completely closed, and which one or more air gaps remain constant throughout the life of the device as distinguished from electromagnetic devices wherein a magnetic part is attracted to and sealed against an electromagnet when energized or in which non-magnetic spacers are utilized in an attempt to maintain an air gap. The present device thereby eliminates any sticking or magnetic "hang up" of the actuated member and any differential in the "pick up" and "drop out" of the device as, for example, due to residual magnetism. The electromagnetic operator of the present invention not only affords the necessary power for operating the valve or other member to be actuated but has great sensitivity and is quick in response.

Another object is to provide an improved electromagnetic operating means for translation of electric energy to rotary mechanical movement, and more particularly, to rotary movement that may be of greater angular degree (i. e., as great as 90° if desired) and which angular movement may be stopped by dynamically braking the armature movement with resulting quiet or silent operation as distinguished from employing a mechanical stop.

Another object is to provide an improved form of device having, combined in one unit if desired, an electromagnetic operator and a transformer including a magnetic frame and primary and secondary windings for establishing magnetic flux in said frame and diverting the magnetic flux across the one or more air gaps which transformer constitutes a current limiting step-down transformer wherein the electric energy produced in the secondary winding may be relatively low and substantially constant so that the secondary circuit and a thermostat or other condition responsive means therefor will not be deleteriously affected by the energizing current supplied to the primary winding and so that the type of insulating conduits required for line voltage conductors are unnecessary. The device is immune to short circuits on the secondary side of the transformer from the standpoint of damage due to overheating.

Another advantage of the device of the present application is that stand-by power loss is low; that is, there is relatively low power consumption when the secondary circuit is not energized. This stand-by loss compares favorably with a conventional current limiting transformer.

Another object is to provide biasing means for biasing the armature in a direction opposite to the direction in which it is moved by magnetic flux across the one or more air gaps and which biasing means is effective when no flux is present in the air gaps to move the actuated member to one of its positions and to position the armature where it will be acted upon by magnetic flux across the air gaps to move the actuated member to its other position.

Another object is to provide an improved form of device of the herein mentioned character in which the force afforded by the armature portions for a pair of air gaps is additive thereby affording increased force for the operator for a given value of flux density.

Another object is to provide a device which includes a rotary armature in the form of a closed conducting loop there being a magnetic frame having a portion within the loop and a portion outside the loop to form at least one air gap and a winding on the magnetic frame which when energized is adapted to produce magnetic flux in the magnetic frame and across the air gap and wherein the loop affords a current conducting path of closed circuit looped form surrounding the portion of the magnetic frame within the loop through which path current induced by energization of the winding is adapted to flow for reaction with the magnetic flux in the air gap to impart turning movement to the armature by reaction of electric current induced in the loop with the magnetic flux across the one or more air gaps.

Another object is to provide in a device of the aforementioned character wherein the magnetic flux across the one or more air gaps remains constant during the entire operation of the device whereas the flux linking the armature and the electric current induced in the armature decreases as the armature moves from starting position to the position to which it is actuated.

Further objects and advantages and numerous adaptations of the invention will appear from the following detailed description taken in connection with the accompanying drawings, it being understood that the invention is limited only within the scope of the appended claims and not the particular embodiment selected for illustration.

In the drawings:

Figure 2 is a sectional view taken on the line 2—2 of Figure 1; and

Figure 3 is a sectional view taken on the line 3—3 of Figure 1.

Figure 1:
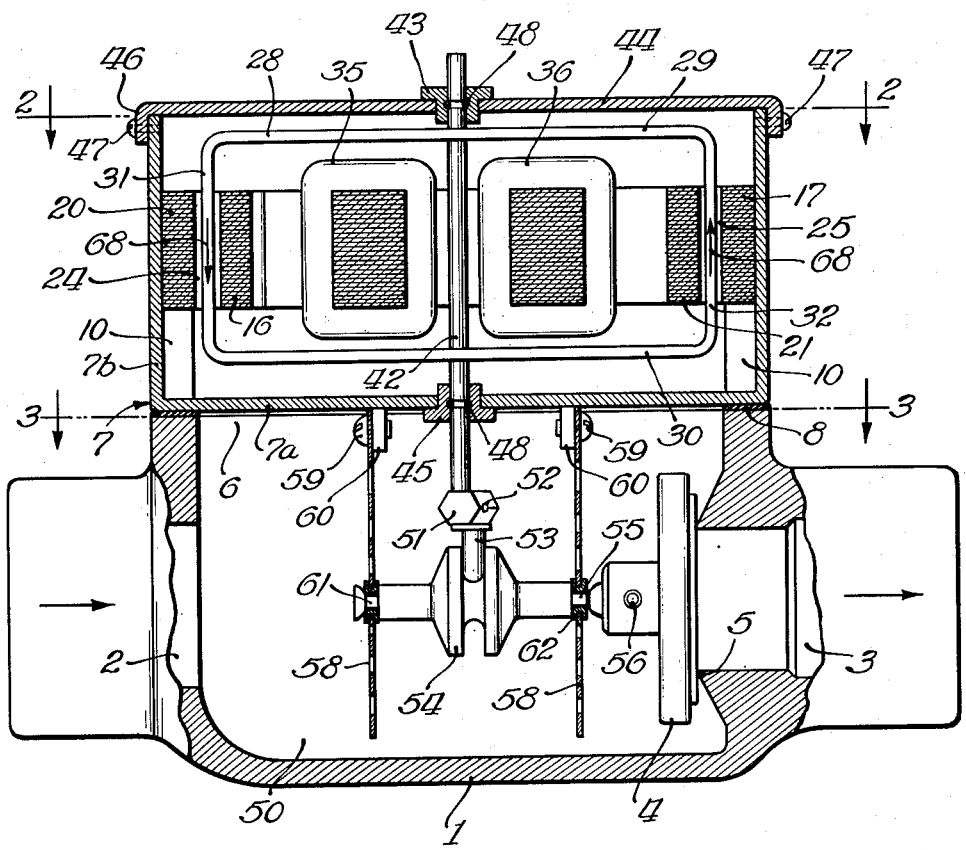
Figure 1 is an axial sectional view of one form of device embodying the present invention.

Referring now to the drawings, the embodiment of the invention therein illustrated comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid. It will be noted that the controlled fluid tends to hold the valve member 4 closed. This may, of course, vary within the scope of the present invention.

The valve body 1 has an opening 6 covered by an enclosure 7 for electromagnetic operator means to be presently described. The bottom wall 7a of enclosure 7 affords a plate-like cover for opening 6 and may be secured in place, for example, by screws (not shown) screwed into the valve body 1. Sealing means 8 is preferably interposed between the plate 7a and valve body 1 to render the connection gas tight. The upper side of base plate 7a is provided with an integrally formed wall 7b which may be of configuration best shown in Figures 1 and 2 and encloses the electromagnetic operator means. The enclosure 7 is preferably formed of aluminum or other suitable non-magnetic material.

Mounted, for example, upon a supporting ring 10 within the enclosure 7 is a power unit comprising a magnetic frame 11 of laminated or other suitable form. The particular frame 11 selected for illustration includes a portion of generally rectangular configuration comprising a pair of parallel side legs 12 and 13 magnetically connected by parallel end legs 14 and 15. The ring 10 is preferably formed of non-magnetic material and the magnetic frame 11 may be secured in place, for example, by screws (not shown) screwed into the ring 10 or otherwise as desired. Other means for supporting the power unit within the enclosure 7 are contemplated within the scope of the present invention.

A first pair of magnetic arms 16 and 17 of arcuate form and magnetically connected at 18 and 19 to one end of the frame 11 extend along opposite sides of the frame. A second pair of magnetic arms 20 and 21 of arcuate form are magnetically connected to the opposite end of the frame 11 at 22 and 23 and extend along opposite sides of the frame into overlapping and spaced relation to the arms 18 and 19 to form a pair of arcuate air gaps 24 and 25 therebetween. The aforementioned arrangement of the magnetic arms 16, 20, 21 and 17 provides relatively long arcuate air gaps 24 and 25 for rotary or turning movement of the armature to be presently described of relatively greater angular degree (i. e., as great as 90° if desired).

The rotary armature 28 is in the form of a unitary integrally formed closed conducting loop preferably formed of copper or other non-magnetic and good conducting material. In general, the looped armature 28 may be of generally rectangular configuration in vertical section as shown in Figure 1 comprising parallel legs 29 and 30 extending generally transversely with respect to the axis of turning movement of the armature and conductively connected by parallel end legs 31 and 32. As best illustrated in Figure 1, the generally rectangular portion of the magnetic frame 11 is located within the conducting looped armature 28 and the legs 16 and 21 extend in opposite directions into the loop whereas the legs 20 and 17 extend in opposite directions externally of the loop. The end legs 31 and 32 operate in the air gaps 24 and 25 to impart turning movement to the armature by magnetic flux across the air gaps. The loop affords a current conducting path of closed circuit looped form which surrounds the portion of the magnetic frame 11 within the loop; also the arms 16 and 21 and the winding or windings as will presently appear.

The power unit further comprises a primary winding 35 and a secondary winding 36. The primary winding 35 is adapted to be connected to a suitable source of electrical energy as depicted by the symbol 37 in Figure 2. The circuit of the secondary winding 36 may include condition responsive means such as a thermostat illustrated schematically at 38 in Figure 2. It will be understood that when the primary winding 35 is energized and the secondary open, the magnetic flux created in the magnetic frame 11 will tend to flow around the frame through the leg 13 upon which the secondary winding is mounted as indicated by the arrows 39 in Figure 2 in preference to jumping the air gaps 24 and 25 between arms 20 and 16 and 21 and 17. However, when the secondary circuit is closed, induced currents in the secondary winding 36 will divert the magnetic flux from the leg 13 and across the air gaps 24 and 25 as indicated by the arrows 40 in Figure 2 to cause movement of the armature 28 about its axis as will hereinafter be described.

As shown in Figure 1, the armature legs 29 and 30 are non-rotatably connected intermediate their ends to a shaft 42 to turn this shaft about its axis by turning movement imparted to the armature. The shaft 42 is mounted for turning movement, for example, in a sleeve 43 mounted in a cover 44 for the encloseure 7 and in a second sleeve 45 mounted in the base plate 7a. The cover 44 is preferably formed of non-magnetic material and is shown as provided with a flange 46 fitting over the wall 7b and may be secured thereto, for example, by rivets 47 or by screws or otherwise as desired. Resilient or rubber-like O-shaped rings 48 may be mounted in annular grooves in the sleeves 43 and 45 to cooperate with the shaft 42 to provide gastight seals.

For purposes of illustration the shaft 42 is shown more or less schematically as extending downwardly into valve chamber 50 of valve body 1. The lower end of the shaft 42 may be connected, for example, non-rotatably but adjustably to one end of a crank member 51. As best shown in Figure 3, the crank member 51 may be non-rotatably connected to the shaft 42 as by a pin 52 for transmission of any turning movement of armature 28 to crank member 51. At the opposite end of the crank is a downwardly extending pin 53 off center with respect to the axis of rotation of shaft 42. The pin 53 is adapted to engage a yoke 54 (Figure 1) connected at one end as by a stem 55 and pin 56 to the valve member 4.

The aforementioned yoke-valve member assembly is preferably of the form illustrated and described in the copending application of Floyd J. Bydalek and Russell B. Matthews, Serial No. 270,666, filed February 8, 1952. The details of this assembly may be ascertained more fully by reference to the above mentioned copending application. Suffice it for purposes of the present application to state that the yoke-valve member assembly is preferably suspended in the valve body 1 as by a pair of springs 58 attached as by screws 59, for example, to integral portions 60 of the plate 7a which integral portions 60 extend inwardly through the opening 6 of the valve body. The springs 58 serve to support the valve member assembly in alignment with the valve seat 5 and may, if desired, serve also to bias both the armature 28 and valve member 4 as will presently appear. When the plate 7a carrying the power unit or electromagnetic operator is removed and/or replaced, the valve member assembly is removed and replaced therewith as a unit.

As shown in the aforementioned copending application, the springs 58 are preferably of flat spiral configuration in plan and conical helically in side elevation when uncompressed but numerous other configurations are contemplated. That is to say, when the turns of the springs are in a plane as shown in Figure 1, they are under compression and impart, for example, a sealing force to valve member 4 against its valve seat 5. Movement of the valve member 4 to open position against the bias of the springs 58 further compresses the latter. In this regard, while as above mentioned the ends of the outermost turns of the springs 58 are attached to plate 7a as herein described, the innermost turn of each spring is attached to the yoke assembly at 61 and 62.

The operation of the illustrated embodiment of the invention is as follows:

In unenergized condition the rotor 28 is angularly disposed approximately in the position shown in full lines in Figure 2. The valve member 4 may be in closed position at this time as shown in Figure 1 but it is to be understood that the valve may, of course, be normally open and operated to closed position by the magnetic operator. It is to be further understood that as previously set forth the electromagnetic operator may be used to operate an electric switch or any other similar or desired device.

It is to be further understood that the angular position of the shaft 42 and hence armature 28 and valve member 4 when the electromagnetic operator is unenergized is determined in the illustrated embodiment of the invention, for example, by the bias of the springs 58. In the illustrated embodiment of the invention, the sealing of the valve member 4 against the valve seat 5 under the spring bias limits rotation or turning movement of the armature and provides a stop therefor in its unenergized state.

In the unenergized position of the armature but with the circuit of the coil or winding 35 closed, this coil generates magnetic flux in the magnetic frame 11 which at one-half of the alternating current cycle flows in the direction of the arrows 39 in Figure 2. Current is not induced in the rotor 28 at this time because the circulating flux 39 does not link a rotor side. When the net flux linkage is zero the induced current is zero.

When the circuit of the secondary winding 36 is closed as, for example, by closure of the contacts of the thermostat 38, the magnetic flux of the magnetic frame 11 (minus the small amount required to excite the secondary winding 36) will no longer flow through the leg 13 of the frame but will be diverted through the magnetic arms 20 and 21, across the air gaps 24 and 25 and will return through the magnetic arms 16 and 17 in the direction of the arrows 40 in Figure 2. The flow of flux 40 is such that the total flux flowing in leg 12 is now efficiently linking armature or rotor 28 which induces a large electric current in the armature. This electric current flows down the leg 31 and up the leg 32 as indicated by the arrow 68 in Figure 1. This linkage will be readily apparent by observing that all of the flux leaving one side of the coil 28 returns to the opposite side of the coil 28 via a path external to coil 28 in the starting position of the armature.

The electric current induced in armature 28 is of the proper phase and direction to react with the flux crossing air gaps 24 and 25 and impart by repulsion turning movement to the armature 28 in the direction indicated by the arrow 69 in Figure 2. This turning movement continues until armature 28 reaches the position shown in dotted lines in Figure 2.

As the armature 28 turns from its starting position the amount of flux 40 linking the armature decreases until at the dotted line position of the armature all flux 40, except for a small amount which is effective to hold the armature 28 in its dotted line position against, for example, the bias of springs 58, returns via the legs 16 and 21. This latter flux does not link the armature 28. Only a small amount of flux sufficient to maintain the armature in its energized or dotted line position returns via legs 17 and 20 and across air gaps 24 and 25 externally to armature 28. It will be noted that the air gap flux remains constant during the entire operation. It is the current induced in the armature or rotor that decreases as the armature moves to its energized or dotted line position. The armature 28 as it reaches its dotted line position is afforded a dynamic braking action instead of requiring a mechanical stop. This makes for quiet operation.

The generation of the maximum force when the armature 28 is in its full line position (Figure 2) and with the valve member 4 in closed position affords maximum torque or turning force at the start of the operator movement. It is this maximum initial force which as previously set forth is advantageous in overcoming the inertia and friction of the moving parts and in overcoming fluid pressures in "cracking" or opening a valve wherein the controlled fluid tends to hold the valve closed.

It is, of course, understood that rotation of the armature and consequent movement of the valve member 4 through the linkage of the shaft 42, crank member 51 and yoke 54 is against the bias of the spring 58, which return both the valve member 4 and the armature 28 to their initial position upon deenergization of the armature 28, for example, by reopening the contacts at the thermostat 38.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

I claim:

1. An electromagnetic operator comprising a magnetic frame, a winding which when energized is adapted to produce magnetic flux in said frame, a first magnetic arm of arcuate form, a second magnetic arm of arcuate form disposed in spaced relation to said first arm to form an arcuate air gap therebetween, and a rotary armature in the form of a closed conducting loop surrounding said magnetic frame and having a leg operable in said air gap to impart turning movement to said armature by reaction of electric current induced in said loop with magnetic flux across said air gap, said magnetic frame including at least one magnetic leg extending through said conducting loop and magnetically connected at one end to said first magnetic arm, the opposite end of said magnetic leg being magnetically disconnected from said first magnetic arm and magnetically connected to said second magnetic arm whereby upon energization of said winding to cause initial maximum linking of said armature by said magnetic flux and decrease in linking of said armature by said magnetic flux as said armature turns from its starting position.

2. An electromagnetic operator comprising a rotary armature in the form of a closed conducting loop, a power unit including a magnetic frame located within said loop and a winding which when energized is adapted to produce magnetic flux in said frame, a first magnetic arm of arcuate form magnetically connected to said frame and extending internally of said loop, and a second magnetic arm of arcuate form magnetically connected to said frame and extending externally of said loop in spaced relation to said first arm to form an arcuate air gap therebetween, said loop having a leg operable in said air gap to impart turning movement to said armature by reaction of electric current induced in said loop with magnetic flux across said air gap.

3. An electromagnetic operator comprising a magnetic frame, a winding which when energized is adapted to produce magnetic flux in said frame, a first pair of magnetic arms of arcuate form magnetically connected to said frame, a second pair of magnetic arms of arcuate form magnetically connected to said frame and disposed in spaced relation to said first arms to form a pair of arcuate air gaps therebetween, and a rotary armature in the form of a closed conducting loop surrounding said magnetic frame and having legs operable in said air gaps to impart turning movement to said armature by reaction of electric current induced in said loop with magnetic flux across said air gaps.

4. An electromagnetic operator comprising a rotary armature in the form of a closed conducting loop, a power unit including a magnetic frame located within said loop and a winding which when energized is adapted to produce magnetic flux in said frame, a first pair of magnetic arms of arcuate form magnetically connected to said frame and extending internally of said loop, and a second pair of magnetic arms of arcuate form magnetically connected to said frame and extending externally of said loop in spaced relation to said first arms to form a pair of arcuate air gaps therebetween, said loop having a pair of legs one operable in each air gap to impart turning movement to said armature by reaction of electric current induced in said loop with magnetic flux in said air gaps.

5. An electromagnetic operator comprising a rotary armature in the form of a closed conducting loop, a power unit including a magnetic frame located within said loop and a winding which when energized is adapted to produce magnetic flux in said frame, a first pair of magnetic arms of arcuate form magnetically connected to one end of said frame and extending along opposite sides of said frame, one of said first arms extending internally of said loop and the other of said first arms extending externally of said loop, and a second pair of magnetic arms of arcuate form magnetically connected to the opposite end of said frame and extending into overlapping and spaced relation relative to said first arms to form a pair of arcuate air gaps therebetween, one of said second arms extending internally of said loop and the other of said second arms extending externally of said loop, said loop having a pair of legs one operable in each air gap to impart turning movement to said armature by reaction of electric current induced in said loop with magnetic flux in said air gaps.

6. An electromagnetic operator comprising, in combination, an armature in the form of a closed electrical conducting loop mounted for turning movement about an axis, a magnetically permeable frame having at least one leg extending through said loop and a pair of oppositely extending magnetically permeable arcuate arms extending in overlapping relation from said frame at opposite ends of said one leg and spaced to form an air gap independent of said one leg, said arms having oppositely directed free ends magnetically disconnected from said frame, said loop having a leg operable in said air gap, and a winding positioned relative to said frame to produce when energized magnetic flux in said frame, the opposite extension of said arms from said frame at opposite ends of said one leg being effective to cause initial maximum linking of said armature leg by said magnetic flux and decrease in linking of said armature leg by said magnetic flux as said armature turns from its starting position.

7. An electromagnetic operator comprising, in combination, an armature in the form of a closed electrical conducting loop mounted for turning movement about an axis, a magnetically permeable frame having at least one leg extending through said loop and two pairs of oppositely extending magnetically permeable arcuate arms extending in overlapping relation from opposite sides of said frame at opposite ends of said one leg and spaced to form a pair of air gaps independent of said one leg, said arms having oppositely directed free ends magnetically disconnected from said frame, said loop having a pair of opposite legs one operable in each air gap, and a winding positioned relative to said frame to produce when energized magnetic flux in said frame, the opposite extension of said arms from said frame at opposite ends of said one leg being effective to cause initial maximum linking of said armature leg by said magnetic flux and decrease in linking of said armature leg by said magnetic flux as said armature turns from its starting position.

8. An electromagnetic operator comprising, in combination, an armature in the form of a closed electrical conducting loop mounted for turning movement about an axis, and magnetic flux producing means positioned within said loop and including a magnetically permeable frame in which magnetic flux produced by said flux producing means is adapted to flow, said magnetically permeable frame having portions thereof spaced to form an air gap across which said magnetic flux is adapted to flow and in which at least one leg of said loop is adapted to operate for induction in said loop by the flow of magnetic flux an electric current which reacts with said magnetic flux to impart, by repulsion, turning movement to said armature.

9. An electromagnetic operator comprising, in combination, an armature in the form of a closed electrical conducting loop having opposite legs and mounted for turning movement about an axis, and magnetic flux producing means positioned within said loop and including a magnetically permeable frame in which magnetic flux produced by said flux producing means is adapted to flow, said magnetically permeable frame having opposite pairs of portions thereof spaced to form opposite air gaps across which said magnetic flux is adapted to flow and in each of which gaps one of said legs of said loop is adapted to operate for induction in said loop by the flow of magnetic flux of an electric current which reacts along each leg of said loop with said magnetic flux to impart, by repulsion, turning movement to said armature.

10. An electromagnetic operator comprising a magnetic frame having spaced portions with an air gap therebetween, a winding positioned relative to said frame to produce when energized magnetic flux in said frame and across said air gap, an armature in the form of a closed conducting loop mounted for turning movement about an axis and having a leg operable in said air gap whereby said magnetic flux induces current flow in said closed loop, the current induced in said loop affording flux reacting with the flux across said air gap to impart by repulsion of said armature maximum initial force for turning said armature from its initial position, the amount of current induced in said loop and hence the turning force on said armature decreasing as the armature moves from starting position to the position to which it is actuated.

11. An electromagnetic operator comprising a magnetic frame having spaced portions with an air gap therebetween, a primary winding positioned relative to said frame to produce when energized magnetic flux in said frame and across said air gap, an armature in the form of a closed conducting loop mounted for turning movement about an axis and having a leg operable in said air gap whereby said magnetic flux induces current flow in said closed loop, the current induced in said loop affording flux reacting with the flux across said air gap to impart by repulsion of said armature maximum initial force for turning said armature from its initial position, and a secondary winding on said magnetic frame having a circuit and in which current is induced by energization of said primary winding when said circuit is closed, the amount of current induced in said loop and hence the turning force on said armature decreasing as the armature moves from starting position to the position to which it is actuated.

References Cited in the file of this patent

UNITED STATES PATENTS

| | | |
|---|---|---|
| 1,693,135 | Cardwell | Nov. 27, 1928 |
| 2,273,317 | Hansen | Feb. 17, 1942 |
| 2,508,380 | Freedman | May 23, 1950 |
| 2,508,410 | Lunas | May 23, 1950 |
| 2,671,863 | Matthews | Mar. 9, 1954 |

FOREIGN PATENTS

| | | |
|---|---|---|
| 674,866 | France | Oct. 28, 1929 |